__United States Patent__ [19]

__Earl__

[11] Patent Number: 6,049,866

[45] Date of Patent: *Apr. 11, 2000

[54] METHOD AND SYSTEM FOR AN EFFICIENT USER MODE CACHE MANIPULATION USING A SIMULATED INSTRUCTION

[75] Inventor: William J. Earl, Boulder Creek, Calif.

[73] Assignee: Silicon Graphics, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/709,005

[22] Filed: Sep. 6, 1996

[51] Int. Cl.[7] .................................................. G06F 12/08
[52] U.S. Cl. ..................... 712/227; 711/123; 711/141; 711/154
[58] Field of Search .................................. 395/568, 468, 395/472, 445, 450, 455, 481; 711/141, 123, 128, 145, 118, 154; 712/227

[56] References Cited

U.S. PATENT DOCUMENTS

| | | | |
|---|---|---|---|
| 4,972,317 | 11/1990 | Buonomo et al. | 395/568 |
| 5,524,234 | 6/1996 | Martinez, Jr. et al. | 395/468 |
| 5,535,361 | 7/1996 | Hirata et al. | 395/472 |
| 5,551,001 | 8/1996 | Cohen et al. | 395/449 |
| 5,623,617 | 4/1997 | Davidian | 395/568 |
| 5,632,028 | 5/1997 | Thusoo et al. | 395/500 |

OTHER PUBLICATIONS

Motorola (M6800) "8–/16–/32–Bit Microprocessors Programmer's Refernce Manual" fifth edition p. 4–10 to 4–11, 1986.

Motorola (MC68030) "Enhanced 32–Bit microprocessor user's manual second edition", 1989.

(Alpha Architecture Reference Manual) Sites; Digital Press p. 4–115, Jul. 1992.

Primary Examiner—Parshotam S. Lall
Assistant Examiner—Gautam R. Patel
Attorney, Agent, or Firm—Wagner, Murabito & Hao LLP

[57] ABSTRACT

A method and a system for fast user mode cache synchronization. The present invention is implemented on a computer system having a instruction cache. The system of the present invention detects a simulated instruction from a process running on the computer system while the process is running in a user mode. The simulated instruction causes an error exception and the operating system traps the error. The kernel then interprets the simulated instruction is then as an instruction cache synchronization instruction. The instruction cache synchronization instruction is executed and the program counter is incremented. The present invention then returns to the process in user mode. During instruction execution, preloaded registers that contain a starting address and an ending address, defining an address range, are read. The entries of the instruction cache are read and those entries falling within the address range are marked as invalid to maintain instruction cache coherency.

23 Claims, 6 Drawing Sheets

METHOD AND SYSTEM FOR AN EFFICIENT USER MODE CACHE MANIPULATION USING A SIMULATED INSTRUCTION

FIELD OF THE INVENTION

The field of the present invention pertains to cache memory management. More particularly, the present invention relates to instruction and data cache synchronization through a software mechanism running in user mode.

BACKGROUND OF THE INVENTION

Coordinating the operation of the computer system's memory hardware resources is a primary task of an operating system. An operating system, in conjunction with the dedicated memory management hardware of the computer system, manages the computer system's memory resources through the use of memory management protocols. The memory management protocols are necessary to maintain "coherency" between data existing simultaneously in different locations (e.g., a block of instructions stored in both main memory and an instruction or data cache). Coherency refers to the consistency of the data stored in two or more locations. A cache which is consistent with main memory is referred to as a coherent cache. The process of making a cache coherent is referred to as cache synchronization.

A central processing unit (cpu) speeds memory accesses by accessing "cache resident" instructions or data whenever possible. A "cache hit" is where the next instruction or data of a software process resides in the cache, in addition to main memory. An instruction cache is a specialized cache which provides fast temporary storage of software instructions. When the next instruction of a software process resides in the instruction cache, the instruction is quickly fetched and executed, as opposed to accessing main memory. Where the instructions in the instruction cache are not consistent with main memory (e.g., incoherent), a program can process inaccurate data or can execute improper instructions.

Maintaining instruction cache coherency is a particular problem with regard to software emulation programs. More particularly, instruction cache coherency is a problem for software emulation programs where the program code of a non-native software program is both translated into native program code and executed on the computer system at run time (e.g., on the fly). Because instructions are continually being written to main memory and executed, instruction cache incoherency occurs more frequently with software emulation programs than with other types of programs.

A first solution to the above problem is to fabricate a cpu having hardware cache synchronization circuitry. In such a cpu, instruction cache coherency is maintained by dedicated hardware, e.g., the Power PC 601 from Motorola corporation. The use of dedicated hardware cache synchronization circuitry eliminates the need for memory management protocols, since instruction cache coherency is maintained automatically. Dedicated hardware synchronization circuitry, however, can be an expensive and complex solution and may slow down the processor by increasing the minimum cycle time.

A second solution to the above problem is to fabricate a cpu having a native instruction where the native instruction accomplishes instruction cache synchronization. In such a cpu, a native instruction cache synchronization instruction is simply part of that cpu's instruction set. The cpu architecture, however, must be designed from the outset to support a native instruction cache synchronization instruction (e.g., RISC cpu architectures, where instructions are implemented in hardware rather than micro-code).

A third solution to the above problem is to implement an instruction cache synchronization instruction through a call to the operating system. A program running on the computer system manipulates the instruction cache by executing a "call" to the operating system. The operating system then steps through its memory management protocols and carries out the instruction cache synchronization. Instruction cache synchronization, however, takes a relatively long time to execute via an operating system call. The operating system steps through its memory management protocols and carries out the desired request if it determines it is "safe" to do so. This ensures the computer system runs reliably, especially when there are other software processes executing simultaneously on the system and also relying on the instruction cache.

Thus, what is desired is a method of initiating instruction cache synchronization instructions directly from user mode without the "overhead" associated with an operating system call. What is desired is a method and system of initiating an instruction cache synchronization instruction directly from user mode in a fast and efficient manner. What is further desired is a method of initiating instruction cache synchronization instructions without requiring dedicated and complex hardware to support the instruction. What is further desired is a method of executing an instruction cache synchronization instruction in a cpu architecture which does not specifically support a native instruction cache synchronization instruction in user mode. The present invention provides the above advantageous features.

SUMMARY OF THE INVENTION

A method and a system for efficient user mode cache synchronization. The present invention is implemented on a computer system having an instruction cache. The system of the present invention detects a simulated instruction from a process running on the computer system while the process is running in a user mode. The simulated instruction causes an error exception and the operating system traps the error. The kernel interprets the simulated instruction as a instruction cache synchronization instruction. The instruction cache synchronization instruction is then executed and the program counter is incremented. The present invention then returns to the process in user mode. Thus, instruction cache synchronization instructions are implemented directly from user mode without the overhead associated with an operating system call. The instruction cache synchronization instruction is initiated from user mode in a fast and efficient manner. The present invention provides a method of executing a instruction cache synchronization instruction in user mode in a cpu architecture which does not specifically support a native instruction cache synchronization instruction. The present invention further provides a method of initiating instruction cache synchronization without requiring dedicated and complex hardware. During instruction execution, preloaded registers that contain a starting address and an ending address, defining an address range, are read. The entries of the instruction cache are read and those entries falling within the address range are marked as invalid to maintain instruction cache coherency. The simulated instruction of the present invention is particularly useful in environments where the program code of a non-native software program is both translated into native program code and executed on the computer system at run time (e.g., on the fly) via a software emulation program.

In one implementation, the present invention executes instruction cache synchronization instructions on a MIPS architecture computer system. Specifically, the present invention implements instruction cache synchronization instructions (e.g., a user mode instruction cache flush instruction) from a software emulation program running in user mode. This allows the software emulation program to manipulate the instruction cache without using a conventional operating system call, or dedicated instruction cache coherency circuitry. Maintaining cache coherency is a particularly useful with regard to software emulation programs. More particularly, software emulation programs where the program code of a non-native software program is both translated into native program code and executed on the computer system at run time (e.g., on the fly). Because instructions are continually being written to main memory and executed, instruction cache incoherency occurs more frequently than with other types of software programs.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

In the following detailed description of the present invention, a method and system for an efficiently invoked user mode instruction cache synchronization, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

NOTATION AND NOMENCLATURE

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "translating" or "processing" or "compiling" or "returning" or "storing" or "writing" or "caching" or the like, refer to the action and processes of a computer system (e.g., 112 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

COMPUTER SYSTEM ENVIRONMENT

Figure 1:
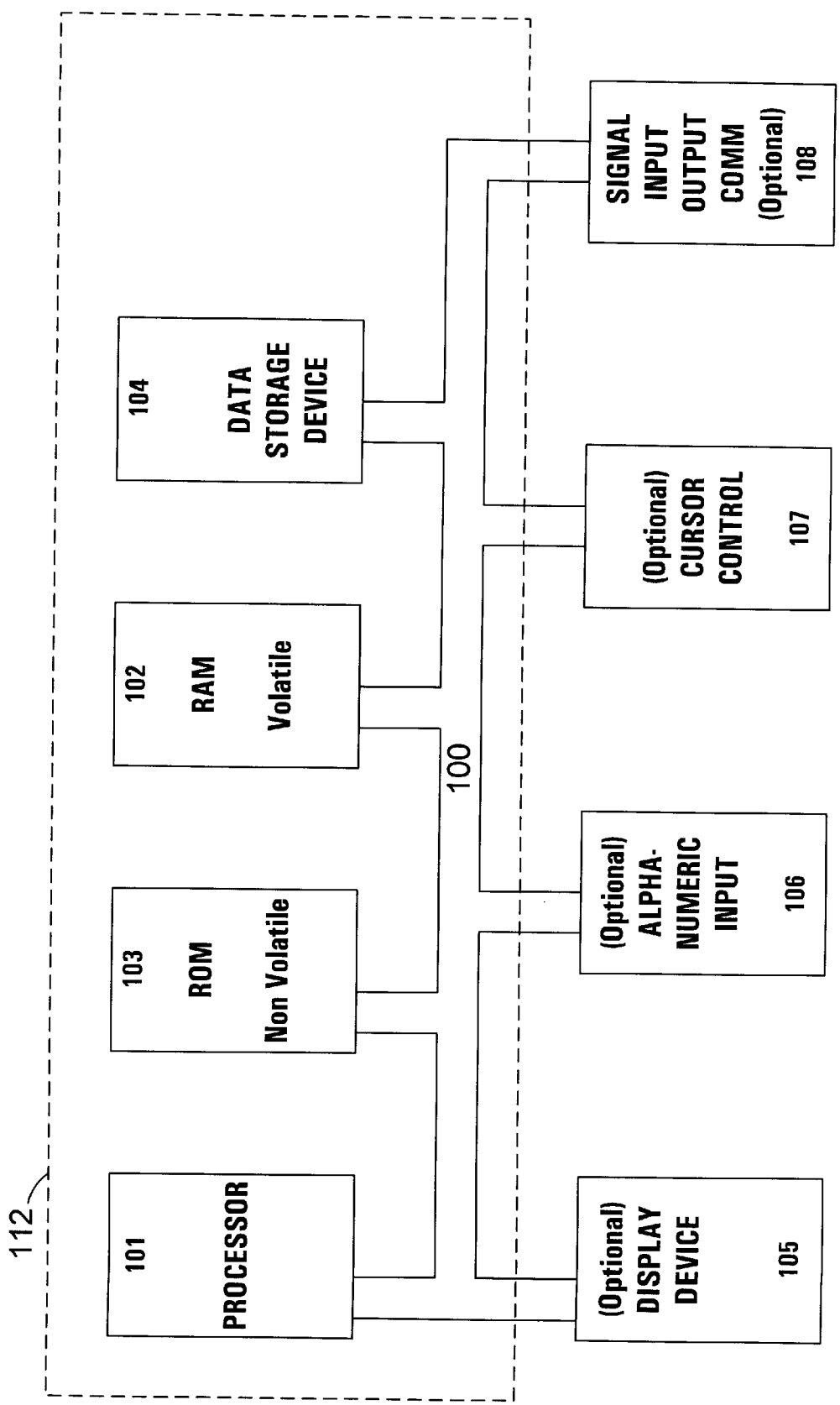
FIG. 1 illustrates a general purpose computer system utilized within the present invention.

Refer to FIG. 1 which illustrates a computer system 112. Within the following discussions of the present invention, certain processes and steps are discussed that are realized, in one embodiment, as a series of instructions (e.g., software program) that reside within computer readable memory units of system 112 and executed by processors of system 112. When executed, the instructions cause the computer system 112 to perform specific actions and exhibit specific behavior which is described in detail to follow.

In general, computer system 112 used by the present invention comprises an address/data bus 100 for communicating information, one or more central processors 101 coupled with the bus 100 for processing information and instructions, a computer readable volatile memory unit 102 (e.g., random access memory, static RAM, dynamic, RAM, etc.) coupled with the bus 100 for storing information and instructions for the central processor(s) 101, a computer readable non-volatile memory unit (e.g., read only memory, programmable ROM, flash memory, EPROM, EEPROM, etc.) coupled with the bus 100 for storing static information and instructions for the processor(s) 101. System 112 also includes a mass storage computer readable data storage device 104 such as a magnetic or optical disk and disk drive coupled with the bus 100 for storing information and instructions. Optionally, system 112 can include a display device 105 coupled to the bus 100 for displaying information to the computer user, an alphanumeric input device 106 including alphanumeric and function keys coupled to the bus 100 for communicating information and command selections to the central processor(s) 101, a cursor control device 107 coupled to the bus for communicating user input information and command selections to the central processor(s) 101, and a signal generating device 108 coupled to the bus 100 for communicating command selections to the processor(s) 101. In the present embodiment, system 112 is a MIPS computer system by Silicon Graphics Incorporated, although the process of the present invention is well suited for operation on a number of well known and commercially available platforms.

The present invention provides a method of initiating instruction cache synchronization instructions directly from user mode without the overhead associated with an operating system call. The present invention operates on the occasions where it is necessary to quickly execute instruction cache synchronization instructions directly from an application program running in user mode. On occasions where instruction cache synchronization by an application program is frequent, the method and the system of the present invention directly manipulates the instruction cache from user mode as opposed to calling the operating system, which in turn manipulates the instruction cache from within it's own protected address space, referred to as kernel mode. Because access to most critical system resources are reserved to kernel mode processes (e.g., the operating system), the present invention executes a "trap" to the operating system in a very fast and efficient manner. This enables cpu architectures not specifically designed with instructions for user mode instruction cache synchronization (e.g. the MIPS architecture) to implement fast and efficient user mode invoked instruction cache synchronization instructions.

The system of the present implimentation of the invention detects a simulated instruction from a process running on the computer system while the process is running in a user mode. While running in user mode, the process runs in an address space separate from the address space used by the operating system. The present invention traps the simulated instruction, which causes an error exception, from the process to a kernel. The kernel is the core part of the operating system that performs basic functions such as system resource allocation and runs in its own isolated address space. The simulated instruction is then interpreted by the system as an instruction cache synchronization instruction. The instruction cache synchronization instruction is then executed by the kernel and the program counter is incremented. The present invention then returns to the process in user mode. The method and system of the present invention is described in greater detail below.

Figure 2:
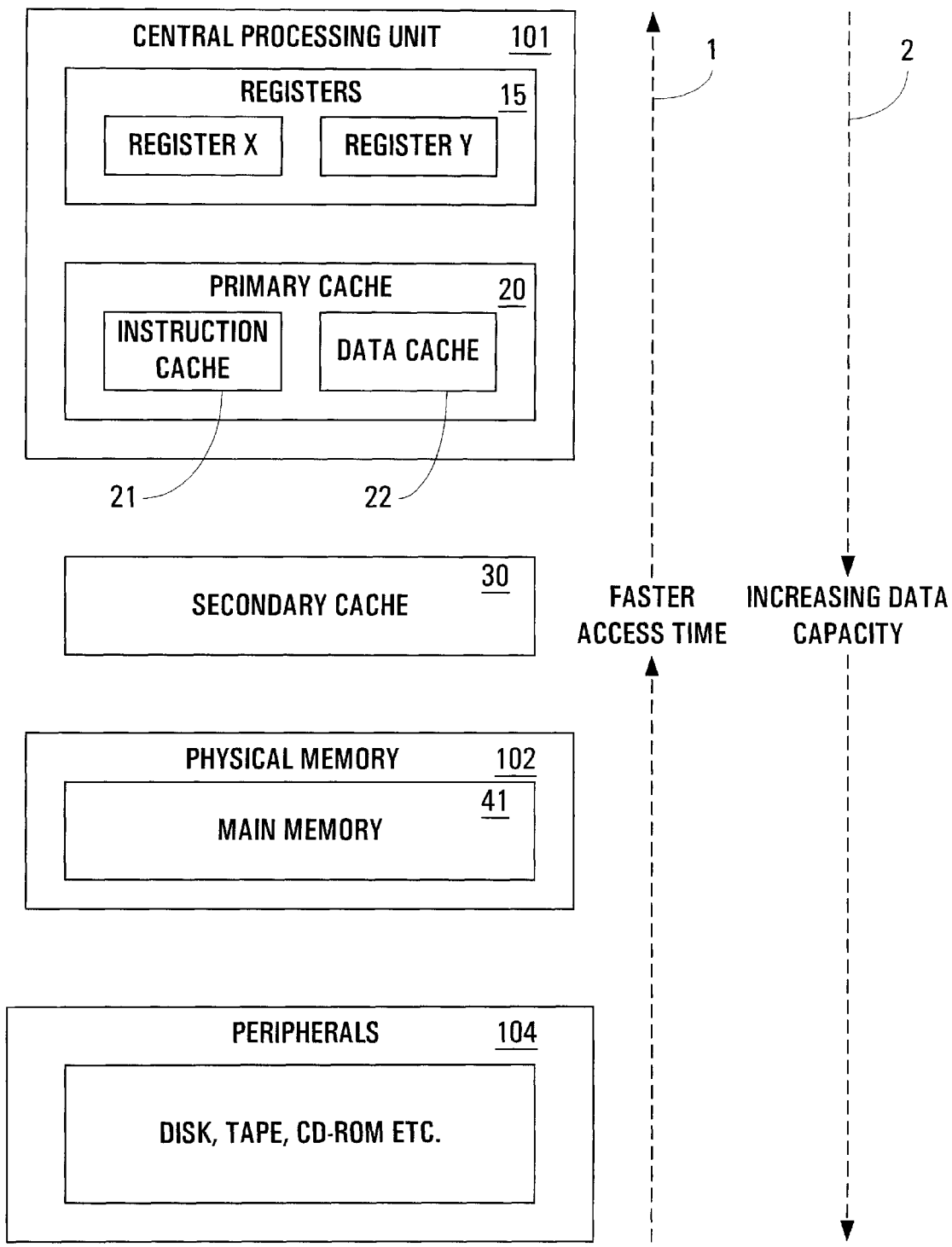
FIG. 2 shows a memory architecture of the general purpose computer system utilized within the present invention.

FIG. 2 shows a more detailed diagram of the basic components of a memory architecture of the computer system 112. The memory architecture includes a processing unit (e.g., cpu) 101 having registers 15 and a primary cache 20. Secondary cache 30 is not integrated into the cpu 101, but is usually located near the cpu 101 on a mother board (not shown). Physical memory 102 and peripherals 104 are also located separately from the cpu 101. FIG. 2 also represents a computer system memory hierarchy. In the hierarchy, each functional block has the capacity to hold more data than the block above it. This is represented by direction 1. In like manner, each functional block takes longer to access than the block directly above it, represented by direction 2. Thus, registers 15 contained within the cpu 101 are accessed very quickly, often in two or less clock cycles, while the capacity of the registers 15 is usually very limited, typically 64 or so bits per register.

Peripherals 104, such as disk drives, tape drives, and the like, have enormous capacity, often measured in gigabytes of storage. The access time of peripherals 104, however, is several orders of magnitude slower than the registers 15 located in the cpu 101. For this reason, registers 15 are used for time critical cpu operations, a primary cache 20 and secondary cache 30 are used for those instructions and data which will not fit in the registers 15, physical memory 102 is used for all other aspects of a process, and peripherals 104 are used for mass storage. The primary cache 20 and secondary cache 30 are used to provide fast temporary data storage to the cpu 101. The primary cache 20 contains two separate caches, the instruction cache 21, and the data cache 22. The primary cache 20 is located within the cpu 101, such that the access time is very fast. The secondary cache 30 contains both instructions and data and is located outside the cpu 101, therefore, access time is not as fast as the primary cache 20, but storage capacity is greater. By providing fast temporary storage, the primary cache 20 and secondary cache 30 speed up software applications in a manner transparent to the user.

The cpu 101 speeds memory accesses by fetching cache resident instructions or data whenever possible. The cpu 101 will look first to the primary cache 20 (e.g., instruction cache 21 or data cache 22) when attempting to execute the next instruction or accessing data. The cpu 101 determines whether this instruction or data is present in the primary cache 20. If the instruction or data is present, the cpu 101 retrieves it. This is referred to as a primary cache hit. If the instruction or data is not in the primary cache 20, the cpu 101 retrieves it from the secondary cache 30 or from main memory 41. This is called a primary cache miss. When a primary cache miss occurs, the cpu 101 determines whether the instruction or data is in the secondary cache 30. If the instruction or data is in the secondary cache 30, it is retrieved and written into the primary cache. If the instruction or data is not present in the secondary cache 30, it is retrieved from main memory 41 and is written into both the primary cache 20 and the secondary cache 30. The cpu 101 then retrieves the instruction or data from the primary cache 20 and continues with the current process.

Thus, in the architecture of FIG. 2, it is possible for the same data to be in 3 places simultaneously: main memory 41, secondary cache 30, and primary cache 20. This data must be consistent to avoid inducing errors in the execution of processes or in the processing of data. Where the data in the primary cache 20 or secondary cache 30 is not consistent with the data stored in main memory 41, a program can process inaccurate data or can execute inaccurate instructions.

The operating system, in conjunction with dedicated memory management hardware of the computer system, manages the memory resources of the computer system 112 through the use of memory read and write protocols. This is because it is imperative that the data existing simultaneously in different locations is consistently and accurately referenced. Data consistency is maintained through the use of write-back methodologies, wherein modified data is not written back to main memory 41 until a cache line (one of many entries in the cache) containing the modified data is replaced. This cache consistency is often referred to as coherency. A cache which is consistent with main memory 41 is referred to as a coherent cache.

In most instances, only the operating system can directly synchronize the instruction cache 21. A program running on the computer system synchronizes the instruction cache 21 by executing a "call" to the operating system. The operating system then steps through its memory management protocols and carries out the desired request if it determines it is "safe" to do so. This ensures the computer system 112 runs reliably, especially when there are other processes executing simultaneously on the computer system 112 and also relying on the instruction cache 21.

The problem is that there are occasions where it is desirable to quickly execute cache synchronization instructions directly from an application program, e.g., from "user mode." Because of the required protocols, operating system calls take a relatively long time to execute. On occasions, as where cache synchronization by an application program is frequent, it is highly desirable to directly synchronize the instruction cache 21 from user mode as opposed to calling the operating system, which in turn synchronizes the instruction cache 21 from within it's own protected address space, referred to as "kernel" mode. Access to most critical resources, however, are justifiably reserved to processes running in kernel mode (e.g., the operating system). Many cpu architectures (e.g., the MIPS architecture) are specifically designed with this fact in mind. In such an architecture, there are no native instruction cache synchronization instructions which originate in user mode and execute quickly. Thus, the present invention provides a method of initiating instruction cache synchronization instructions directly from user mode without the "overhead" associated with an operating system call.

Figure 3:
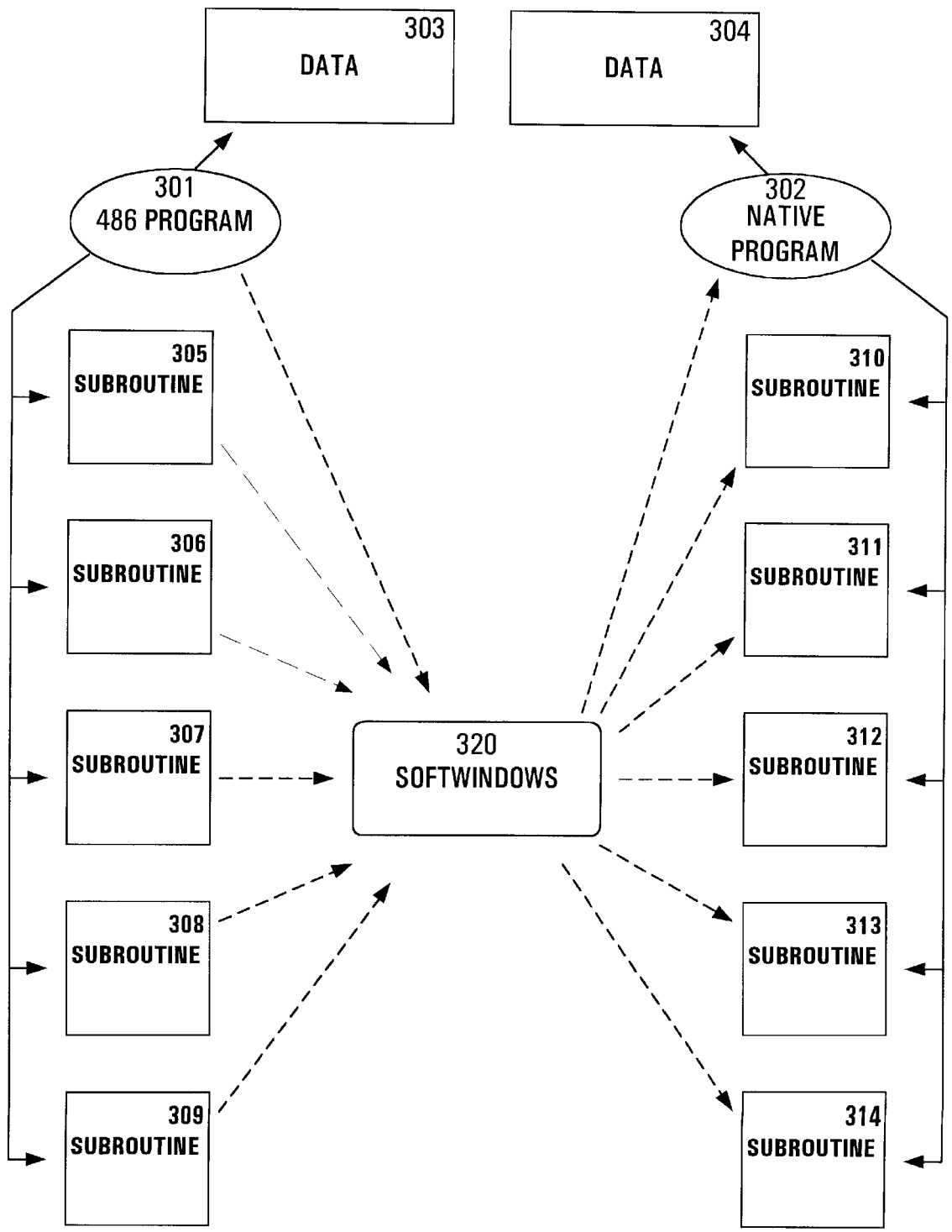
FIG. 3 shows an overall diagram of the process of the present invention.

Referring to FIG. 3, a diagram of the process of one implementation of the present invention is shown. A software emulation program, Softwindows 320, available from Insignia Solutions Ltd., is running in user mode on the computer system 112 of FIG. 2. Softwindows 320 is a computer program which enables a "486" program 301 (a software application written for computer systems built around the Intel x86 architecture and Microsoft Windows operating system) to run on the MIPS architecture of FIG. 1. Softwindows 320 accomplishes this by translating the individual instructions of the 486 program 301 into instructions of a native program 302. The native program 302 then executes on the computer system 112, generating data 304. Softwindows 320 translates the instructions of the 486 program 301 into instructions of the native program 302 "on-the-fly." This refers to the fact that the 486 code is translated and is subsequently executed immediately after translation, at run-time, as oppose complete translation into native code, storage, and then executing at a later time. The on-the-fly translation is done in a manner completely transparent to a user of the computer system 112. In so doing, a user of the computer system 112 interfaces with the 486 program 301 as if it were actually running on an x86 architecture computer system. For Softwindows 320 to be successful, the data 304 created by the native program 302 should be the same as the data 303 which would be created by the 486 program 301 running natively on an x86 computer system.

Referring still to FIG. 3, the on-the-fly translation process of 320 should be accomplished quickly, in real time, if the process 320 is to remain transparent to the user. Softwindows 320 translates the instructions of the 486 program 301 into the instructions of the native program 302, and executes the native instructions comprising native program 302, on-the-fly, in real time. The translation process, however, is very time intensive. To save time, a different procedure is used for recurring portions of the 486 program 301. The 486 program 301, like most other programs, includes a series of subroutines, 305, 306, 307, 308 and 309, (hereafter 305–309) it calls and processes numerous times in the course of its execution. These subroutines 305–309 often account for a very large percentage of the 486 program's execution time. Because of this, Softwindows 320 compiles and stores the series of subroutines 305–309 as translated native subroutines 310, 311, 312, 313, and 314 (hereafter 310–314). The translated native program 302 thereafter calls and executes the translated native versions of the subroutines 310–314. In this manner, Softwindows 320 does not need to translate each 486 subroutine 305–309 each time it is called. When one of the subroutines 305–309 is called, for example, subroutine 305, the corresponding native subroutine, in this case subroutine 310, is fetched from memory and executed instead. Since native subroutine 310 is comprised of native code, native instruction 310 executes very much faster than an on-the-fly translation of 486 subroutine 305.

Because translated native subroutines 310–314 are called and executed frequently, they are usually fetched from the primary cache 20 or the secondary cache 30. Thus, it is possible for the same native subroutines 310–314 to be in 3 places simultaneously: main memory 41, secondary cache 30, and primary cache 20. The code comprising native subroutines 310–314 should be consistent in all places to avoid inducing errors in the execution of the native program 302. Where the code in the primary cache 20 is not consistent with the code stored in main memory 41, native program 302 using the code will behave unpredictably. Instruction cache incoherencies occur due to the on-the-fly translation process of Softwindows 320, e.g., instructions are translated and momentarily stored in main memory 41, but the instruction cache 21 is not updated prior to executing the instructions. Such incoherencies can occur often in computer systems not having hardware instruction cache synchronization circuitry.

Figure 4A:
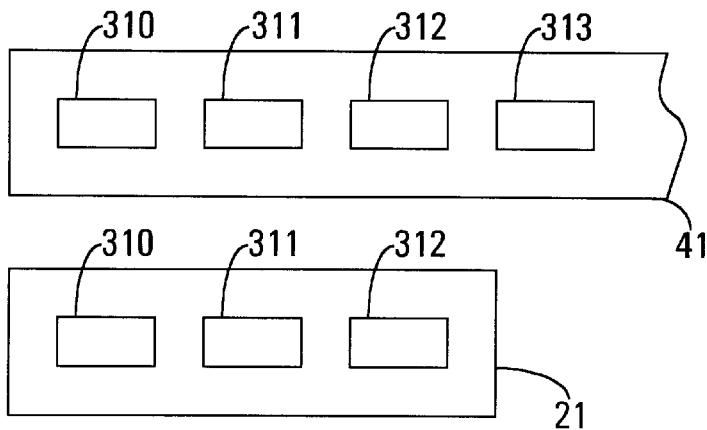
FIG. 4A shows a diagram of a first step in an exemplary cache memory operation of one implimentation of the present invention.
Figure 4B:
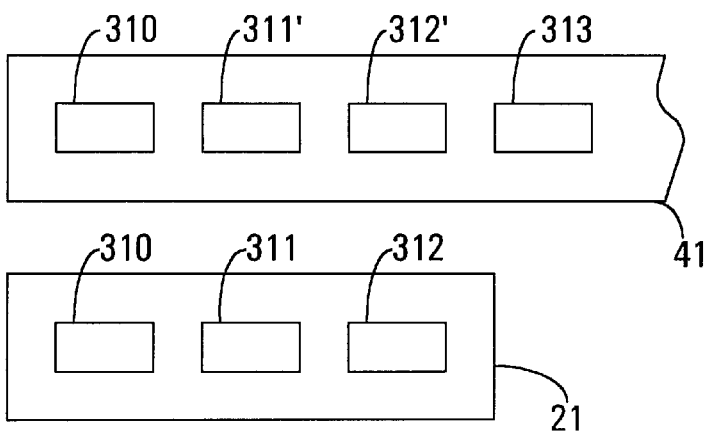
FIG. 4B shows a diagram of a second step in the exemplary cache memory operation of one implementation of the present invention.
Figure 4C:
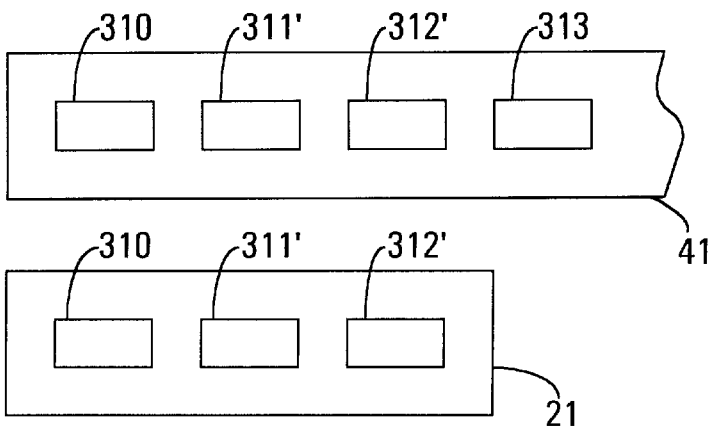
FIG. 4C shows a diagram of a third step in the exemplary cache memory operation of one implementation of the present invention.

Referring now to FIG. 4A, FIG. 4B, and FIG. 4C, a diagram of an exemplary instruction cache memory operation of the present implementation is shown. In FIG. 4A, native subroutines 310–314 and additional code are stored in main memory 41. The instruction cache 21 is filled with the most recently called subroutines, 310, 311, and 312. When subroutines 310, 311, or 312 are called, they will be accessed very quickly since they reside in the instruction cache 21. The instruction cache 21 is coherent with main memory 41 since subroutines 310, 311, and 312 stored in the instruction cache 21, reference the same subroutines 310, 311, and 312 stored in main memory 41. In FIG. 4B, Softwindows 320 has modified the code comprising subroutines 311, and 312, in main memory 41. This happens more frequently with an emulation program such as Softwindows 320 since it is constantly compiling and translating code, storing the compiled code into main memory 41 at some times, executing the compiled code on-the-fly at others. In this instance, the instruction cache 21 has become non-coherent since it references instructions (311 and 312) which are no longer contained in main memory 41. Because of this, Softwindows 320 invalidates the instruction cache 21 by using a simulated instruction in accordance with the present invention. Invalidating entries of the instruction cache 21 insures the recently modified native subroutines 311' and 312' are fetched from main memory 41 as opposed to erroneously fetching 311 and 312 from the instruction cache 21. When the entries of the instruction cache 21 are invalidated, calls to those addresses in the invalidated entries will go out to main memory for the instruction op-code rather than from the instruction cache, and the data cache 22 (not shown) is immediately written back to main memory 41. In FIG. 4C, the instruction cache 21 is refilled with native subroutines 310, 311', and 312' from main memory 41. The instruction cache 21 is now coherent. On subsequent calls to native subroutines 310, 311', and 312', the code will be fetched from the instruction cache 21 while those entries remain valid.

Figure 5:
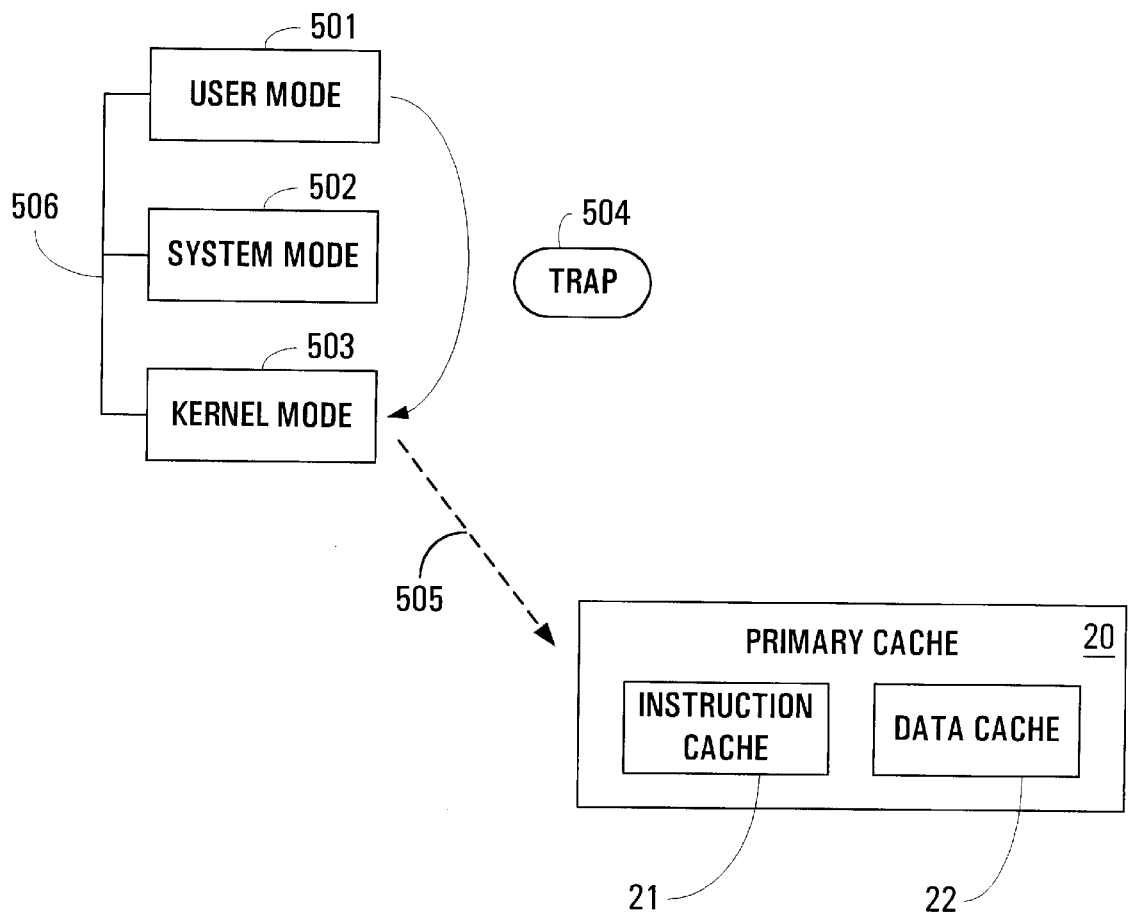
FIG. 5 shows a diagram of a simulated instruction of one implementation of the present invention.

Referring now to FIG. 5, a diagram of a simulated cache synchronization instruction of the present implementation is shown. Softwindows 320 runs in user mode 501, in user mode address space. The core of the operating system (e.g., the kernel) runs in kernel mode 503, in kernel mode address space. In general, only kernel mode 503 processes can directly manipulate the primary cache 20. This is because cache coherency is a critical process within the computer system. Cache coherency is maintained through the use of write-back methodologies, wherein modified data is not written back to main memory 41 until a cache line containing the modified data is replaced. Programs running in user mode 501 on the computer system 112 manipulate the primary cache 20 by executing a call to the operating system kernel, running in kernel mode 503. This procedure is represented by line 506. The kernel steps through its memory management protocols and carries out the desired request upon determining it is safe to do so. This ensures the computer system 112 runs reliably, especially when there are other processes executing simultaneously on the computer system 112 and also relying on the primary cache 20. The MIPS architecture of the present implementation (along with other cpu architectures) are specifically designed with this fact in mind. In such an architecture, there are no native cache synchronization instructions which originate in user mode 501 and bypass kernel write-back protocols, however, the present invention provides a solution.

Referring still to FIG. 5, the simulated instruction of the present implementation is comprised of an illegal instruction which causes an error exception leading to a "trap" 504 to kernel mode 503. A trap refers to an unprogrammed conditional jump to a specified address that is automatically activated by the hardware. Traps are normally triggered by abnormal situations which arise during process execution. The location (address) from which the trap occurred is recorded. The trap is handled by a program located and accessed by a set of routines referred to as a trap handler. In the present implementation, the trap 504 is caused by an illegal instruction and the trap handler recognizes the particular illegal instruction as an instruction cache synchronization instruction. The trap handler jumps to code instructing the kernel to manipulate the instruction cache 21 and the data cache 22 in a manner previously specified. Thus, in the present implementation, the trap handler jumps to code instructing the kernel to invalidate a portion of the instruction cache 21 defined by an address range and write back the data cache 22. In a normal trap situation, the trap handler next jumps back to the recorded address from which the trap occurred and process execution continues. In the present invention, however, the illegal instruction triggering the trap is treated as a normal instruction. The program counter is incremented and the next instruction in the process is executed The following is an exemplary instruction format in accordance with the present invention:

```
001  Ld A, start-address;
002  Ld B, end-address;
003  user_mode_icache_flush; (interpreted as an illegal instruction).
```

The user_mode_icache_flush is the instruction which causes error exception. As such, user-mode_icache_flush can be one of a number of instructions which would cause an error, e.g., BREAK. The illegal instruction causes an error exception, which causes a trap, and the trap handler jumps to code instructing the kernel to invalidate addresses in the instruction cache 21 between start-address (register A) and end-address (register B), write back the data cache 22, increment the program counter, and return to the process.

Thus, the simulated instruction of the present implementation effectively bypasses much of the required protocols used by the operating system and which take a relatively long time to step through. The simulated instruction traps directly to kernel mode 503 from user mode 501, and efficiently manipulates the primary cache 20. The present invention in this manner provides a method and a system of initiating an instruction cache synchronization instruction directly from user mode 501 in a fast and efficient manner.

Figure 6:
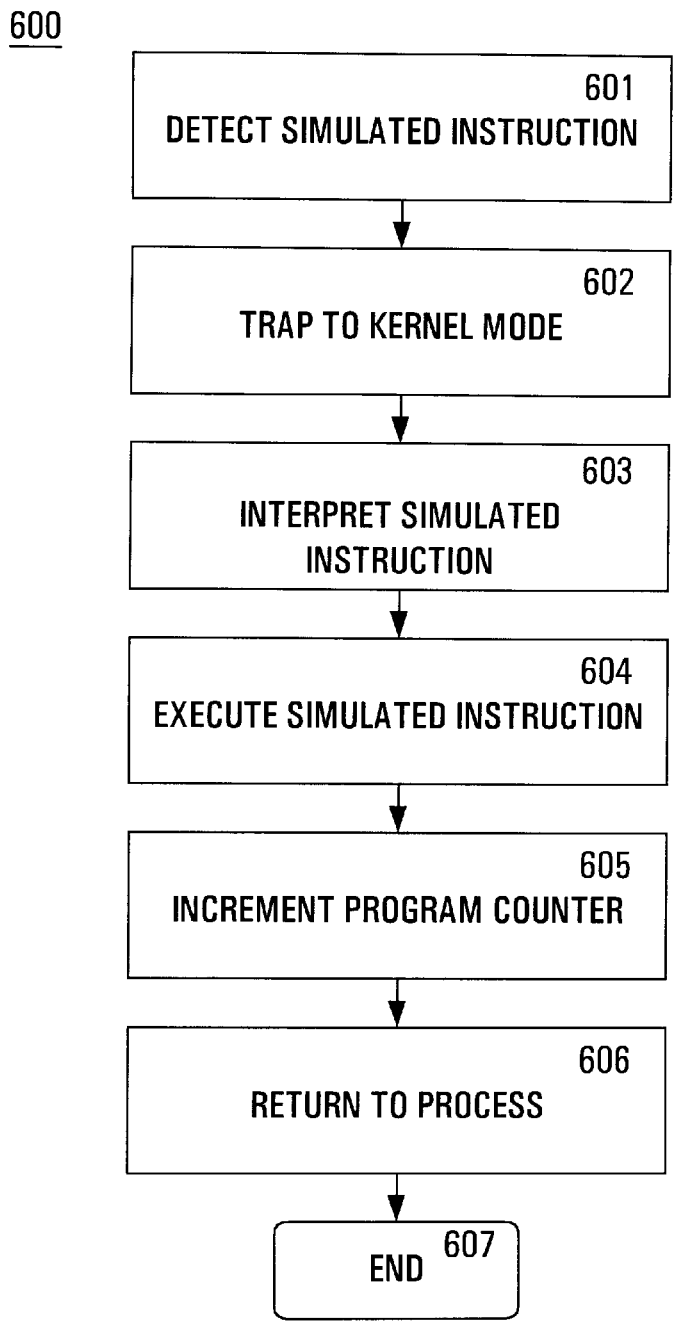
FIG. 6 shows a flow chart of the process of the present invention.

Referring now to FIG. 6, a flow chart of the process 600 of the present invention is shown. Process 600 is implemented as program code stored in computer readable memory units of system 112 (FIG. 1) and when executed by processor 101, causes system 112 to perform the following steps. In step 601, the present invention detects the illegal instruction. The illegal instruction causes an error exception which is trapped directly to kernel mode, in step 602. In step 603 the simulated instruction is interpreted. In this step the trap is handled by the trap handler. In the present implementation, the trap is caused by an illegal instruction and the trap handler recognizes the particular illegal instruction as an instruction cache synchronization instruction. In step 604, the simulated instruction is executed. Here, the trap handler jumps to code instructing the kernel to manipulate the instruction cache in a manner previously specified. Thus, in the present implementation, the trap handler jumps to code instructing the kernel to invalidate instruction cache addresses within a range of addresses stored in a first and second predefined register, and write back the data cache, and the kernel carries out the code instructions.

It should be appreciated that in the present implimentation of the invention, the manipulation of the cache by the kernel should account for memory address range checking. Specifically, the present implementation checks that the supplied addresses are in the user range (positive integer values on the MIPS architecture) and that there is a valid translation look aside buffer (TLB) entry for each page referenced. If there is any problem, the "fast-path" trap handler hands the trap off to the normal trap handler, which then deals with any required TLB refills or address faults. Since, however, in the context where the fast cache synchronization simulated instruction is used, the addresses have normally just been referenced in the course of generating the new instructions which then need to be synchronized with respect to the instruction cache, and thus, the fast-path usually succeeds (e.g., storing the new instructions would have required the TLB entries for the relevant pages to be loaded, so they are usually already valid).

Referring still to FIG. 6, in a normal trap situation, the trap handler next jumps back to the recorded address from which the trap occurred and process execution continues. In the present invention, however, the illegal instruction triggering the trap is treated as a normal instruction. Therefore, in step 605, the program counter is incremented, and in step 606, the process is resumed with the next instruction in the process being executed. The process 600 of the present invention then ends in step 607. Thus, the present invention provides a method and system of initiating a cache synchronization instruction directly from user mode in a fast and efficient manner. The present invention further provides a method and a system of executing a cache synchronization instruction in user mode in a cpu architecture which does not specifically support a native cache synchronization instruction in user mode.

The present invention, a method and system for an efficiently invoked user mode cache synchronization instruction, is thus disclosed. While the present invention has been described in particular embodiments, it should be appreciated that the present invention should not be construed as limited by such embodiments, but rather construed according to the below claims.

What is claimed is:

1. In a computer system having a processor coupled to a bus, a memory coupled to said bus, said processor having an instruction cache and a data cache, a method of synchronizing said instruction cache and said data cache from a program running in a user mode, wherein the processor does not include hardware support for a user mode cache synchronization instruction, said method comprising the computer implemented steps of:
   a) detecting a simulated instruction in a user mode executed program, said instruction, when executed, causing an error exception within said computer system;
   b) responsive to said error exception, executing a trap handler program running in a kernel mode to perform the steps of:
      b1) identifying said simulated instruction as an instruction cache manipulation instruction, wherein said instruction cache manipulation instruction is a privileged kernel mode instruction;
      b2) accessing an address range associated with said instruction cache manipulation instruction by reading a first predefined register to obtain a start address of said address range and reading a second predefined register to obtain an end address of said address range, the values of said first predefined register and said second predefined register determined by said user mode executed program;
      b3) invalidating each entry of said instruction cache that includes an address within said address range;
      b4) writing back entries of said data cache to said memory; and
   c) returning control to said user mode executed program.

2. A method as described in claim 1 wherein step c) comprises the step of incrementing a program counter associated with said user mode executed program such that said program counter points to an instruction following said simulated instruction.

3. A method as described in claim 1 wherein said step b2) comprises the steps of:
   reading a first predefined register to obtain a start address of said address range; and
   reading a second predefined register to obtain an end address of said address range.

4. A method as described in claim 1 wherein said computer system is of a MIPS architecture.

5. A method as described in claim 1 further comprising the steps of: receiving instructions of a program written in a first instruction type; and translating said instructions into native instruction of said computer system, wherein said user mode executed program comprises said native instructions.

6. A computer system having a processor with a cache, the processor coupled to a bus and a memory coupled to the bus, the memory for containing a set of instructions that when executed by the processor causes the computer system to implement a method of efficient cache synchronization from a program running in a user mode, wherein the computer system does not include hardware support for a native user mode cache synchronization instruction, the method comprising the steps of:
   a) detecting a simulated instruction in a user mode executed program, said instruction, when executed, causing an error exception within said computer system;
   b) responsive to said error exception, executing a trap handler program running in a kernel mode to perform the steps of:
      b1) identifying said simulated instruction as an instruction cache manipulation instruction, wherein said instruction cache manipulation instruction is a privileged kernel mode instruction;
      b2) accessing an address range associated with said simulated instruction by reading a first predefined register to obtain a start address of said address range and reading a second predefined register to obtain an end address of said address range, the values of said first predefined register and said second predefined register determined by said user mode executed program;
      b3) invalidating each entry of said instruction cache that includes an address within said address range;
      b4) writing back entries of said data cache to said memory; and
   c) returning control to said user mode executed program.

7. The computer system of claim 6 wherein step c) comprises the step of incrementing a program counter associated with said user mode executed program such that said program counter points to an instruction following said simulated instruction.

8. The computer system of claim 6 wherein said step b2) comprises the steps of:
   reading a first predefined register to obtain a start address of said address range; and
   reading a second predefined register to obtain an end address of said address range.

9. The computer system of claim 6 wherein said computer system is of a MIPS architecture.

10. The computer system of claim 6 further comprising the steps of: receiving instructions of a program written in a first instruction type; and translating said instructions into native instruction of said computer system, wherein said user mode executed program comprises said native instructions.

11. In a computer system having a central processing unit with an instruction cache, a computer implemented method of efficiently invoking a privileged cache synchronization instruction from user mode, the method comprising the computer implemented steps of:
   (a) detecting a simulated instruction from a user mode process;
   (b) trapping the simulated instruction to a kernel;
   (c) interpreting the simulated instruction as a instruction cache synchronization instruction, wherein the computer system does not support a native user mode instruction cache synchronization instruction;
   (d) executing the instruction cache synchronization instruction while in a kernel mode by reading a first predefined register to obtain a start address of an address range and reading a second predefined register to obtain an end address of the address range, the values of the first predefined register and the second predefined register determined by the user mode process
   e) invalidating each entry of the instruction cache that includes an address within the address range; and
   f) returning to the process.

12. The computer implemented method of claim 11 further comprising the step of incrementing a program counter such that the program counter points to an instruction from the process subsequent to the simulated instruction.

13. The computer implemented method of claim 11 wherein step (a) further includes the step of detecting the simulated instruction wherein the simulated instruction is an illegal instruction from the process.

14. The computer implemented method of claim 11 wherein step (a) is further comprised of the step of running the process in a user mode on the computer system.

15. The computer implemented method of claim 11 wherein step (b) is comprised of the step of trapping the simulated instruction to a kernel wherein the simulated instruction is an illegal instruction and the illegal instruction causes the trapping.

16. The computer implemented method of claim 11 wherein step (c) is further comprised of the step of interpreting the simulated instruction as a instruction cache synchronization instruction, wherein a trap handler running in said kernel mode interprets the simulated instruction.

17. The computer implemented method of claim 11 wherein step (d) is further comprised of the steps of:

jumping to a unit of software code instructing the kernel to manipulate the instruction cache; and manipulating the instruction cache in accordance with the unit of software code.

18. The computer implemented method of claim 11 wherein step (e) is further comprised of the steps of recording an address of the simulated instruction;

returning to the process, using the address of the simulated instruction; and executing a next instruction in the process.

19. In a computer system having a processor coupled to a bus, a memory coupled to said bus, said processor having an instruction cache and a data cache, a method of synchronizing said instruction cache and said data cache from a program running in a user mode, wherein the processor does not include hardware support for a user mode cache synchronization instruction, said method comprising the computer implemented steps of:

a) detecting a simulated instruction in a user mode executed program, said instruction, when executed, causing an error exception within said computer system;

b) responsive to said error exception, executing a trap handler program running in a kernel mode to perform the steps of:

b1) identifying said simulated instruction as an instruction cache manipulation instruction, wherein said instruction cache manipulation instruction is a privileged kernel mode instruction;

b2) accessing an address range associated with said instruction cache manipulation instruction by reading a first predefined register to obtain a start address of said address range and reading a second predefined register to obtain an end address of said address range, the values of said first predefined register and said second predefined register determined by said user mode executed program;

b3) invalidating each entry of said instruction cache that includes an address within said address range, wherein the trap handler program uses the start address stored in the first predefined register and the end address stored in the second predefined register to bypass memory management protocols of said computer system and directly access the address range;

b4) writing back entries of said data cache to said memory; and c) returning control to said user mode executed program.

20. The method of claim 19 wherein the user mode program loads the start address into the first predefined register using a first load instruction and loads the start address into the second predefined register using a second load instruction, and subsequently invokes the trap handler program using the simulated instruction.

21. The method of claim 20 wherein the trap handler program performs memory address range checking on said address range before invalidating said each entry of said instruction cache.

22. The method of claim 21 wherein the trap handler program performs memory address range checking by verifying that a valid translation look aside buffer entry exists for said each entry of said instruction cache within said address range.

23. The method of claim 22 wherein said step b3) is aborted if a memory address range check failure occurs, and wherein a second trap handler program is invoked to process said failure.

* * * * *